(12) United States Patent
Tompkin et al.

(10) Patent No.: US 8,928,978 B2
(45) Date of Patent: Jan. 6, 2015

(54) FILM ELEMENT

(75) Inventors: Wayne Robert Tompkin, Baden (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 743 days.

(21) Appl. No.: 12/863,089

(22) PCT Filed: Jan. 16, 2009

(86) PCT No.: PCT/EP2009/000268
§ 371 (c)(1),
(2), (4) Date: Aug. 30, 2010

(87) PCT Pub. No.: WO2009/090091
PCT Pub. Date: Jul. 23, 2009

(65) Prior Publication Data
US 2010/0315714 A1    Dec. 16, 2010

(30) Foreign Application Priority Data

Jan. 17, 2008  (DE) .......................... 10 2008 005 019

(51) Int. Cl.
*G02B 5/18* (2006.01)
*B42D 25/00* (2014.01)
(52) U.S. Cl.
CPC .................................. *B42D 15/105* (2013.01)
USPC .......................................... 359/567; 359/569
(58) Field of Classification Search
USPC ............. 359/2, 571, 566–567, 569, 572, 575, 359/576; 283/86
See application file for complete search history.

(56) References Cited

U.S. PATENT DOCUMENTS

| 4,874,213 A | 10/1989 | Cowan |
| 4,888,260 A | 12/1989 | Cowan |

(Continued)

FOREIGN PATENT DOCUMENTS

| CA | 2611195 | 12/2006 |
| EP | 0609683 | 8/1994 |

(Continued)

OTHER PUBLICATIONS

Cowan (The Aztec Structure: An Improved Replicable Security Device, SPIE-IS&T vol. 6075, pp. 60750Q-1-12) (2006).*

*Primary Examiner* — Stephone B Allen
*Assistant Examiner* — Kimberly N Kakalec
(74) *Attorney, Agent, or Firm* — Hoffmann & Baron, LLP

(57) ABSTRACT

The invention concerns a film element having a replication layer (43), wherein an optically active surface structure (27) is shaped in a first surface of the replication layer. The surface structure is formed in at least a first region of the film element (35) by a first diffractive surface relief (46) comprising a plurality of successive elements following a first envelope curve (47), wherein the elements respectively comprise an element surface (48) arranged substantially parallel to a base surface and at least one flank adjoining the adjacent element surface or surfaces, the element surfaces (48) of adjacent elements are spaced in a direction perpendicular to the base plane, with a first optical spacing or a plurality of the first optical spacing, wherein the first optical spacing is between 150 nm and 800 nm, preferably between 150 nm and 400 nm. The first envelope curve (47) has a spatial frequency of between 100 L/mm and 2000 L/mm and an optical depth of more than 450 nm and the relief shape and the spatial frequency of the envelope curve (47) are so selected that the incident light is diffracted into one or more first directions to represent a first item of information, the color value of which is further determined by the first optical spacing.

40 Claims, 8 Drawing Sheets

(56) References Cited

U.S. PATENT DOCUMENTS

| | | | |
|---|---|---|---|
| 5,101,184 A | 3/1992 | Antes | |
| 6,057,082 A * | 5/2000 | Korth | 430/320 |
| 6,707,518 B1 | 3/2004 | Cowan | |
| 2003/0058491 A1* | 3/2003 | Holmes et al. | 359/2 |
| 2004/0021945 A1* | 2/2004 | Tompkin et al. | 359/566 |
| 2005/0030626 A1 | 2/2005 | Weiteneder et al. | |
| 2006/0285184 A1* | 12/2006 | Phillips et al. | 359/2 |
| 2007/0008595 A1* | 1/2007 | Watanabe et al. | 359/2 |
| 2008/0018965 A1 | 1/2008 | Phillips et al. | |
| 2009/0179418 A1 | 7/2009 | Stalder | |
| 2009/0317595 A1 | 12/2009 | Brehm et al. | |

FOREIGN PATENT DOCUMENTS

| | | |
|---|---|---|
| JP | 61254975 | 11/1986 |
| JP | 61272772 | 12/1986 |
| JP | 62131284 | 6/1987 |
| JP | 03256800 | 11/1991 |
| JP | 07239409 | 9/1995 |
| JP | 2006301312 | 11/2006 |
| WO | WO 01/03945 | 1/2001 |
| WO | WO 02/00445 | 1/2002 |
| WO | WO2005115119 | 12/2005 |

* cited by examiner

US 8,928,978 B2

FILM ELEMENT

This application claims priority based on an International Application filed under the Patent Cooperation Treaty, PCT/EP2009/000268, filed on Jan. 16, 2009 and German Application No. DE 102008005019.0-45, filed on Jan. 17, 2008.

BACKGROUND OF THE INVENTION

The invention concerns a film element having a replication layer in which an optically active surface structure is shaped.

Such film elements are frequently used to cause difficulty with or as far as possible prevent copying, forgery or manipulation of security documents and the misuse of such documents. Such film elements are frequently used for safeguarding for example bank notes, credit cards, debit cards, ID documents, tickets, software certificates and the like. In addition such film elements can also be used in the area of trademark and brand protection, for example by those film elements being applied to or integrated into articles, labels or packaging of products in order in that way for example to authenticate the origin of the product.

To make it difficult to copy, forge or manipulate security documents it is known to superimpose a diffractive surface relief which affords optically variable information by diffraction with a thin film layer system generating an optically variable color impression by means of interference. Thus for example WO 01/03945 A1 describes a security product having a transparent substrate, on one side of which is arranged a thin film layer system. The thin film layer system comprises an absorption layer applied to the transparent substrate and a spacer layer comprising a dielectric material. With a suitable choice of the thickness of the spacer layer a viewing angle-dependent color shift effect is generated by interference. A diffractive surface relief is shaped into the transparent substrate on the side opposite to the thin film layer system or also on the side thereof, the diffractive surface relief for example generating the illusion of a three-dimensional image for the viewer. The optical color effect produced by the thin film layer system by means of interference and the optical effects produced by diffraction at the surface relief are superimposed, thereby giving an optical effect which is difficult to imitate and copy. A similar optical security element is also described in WO 02/00445 A1.

In addition U.S. Pat. No. 4,874,213 describes a method of achieving the optical effect which can be attained by a volume hologram, by means of a relief profile which is embossed in a surface. For that purpose the volume hologram is copied into a photosensitive layer and then the Bragg planes of the volume hologram are opened by an opened hologram in a preferably regular pattern so that the volume hologram becomes visible by reflection at the opened surfaces and interference. To avoid as far as possible forgery of the representation of the volume hologram by the opened hologram, the latter is so selected that its diffraction efficiency has a maximum in the zero-order region.

SUMMARY OF THE INVENTION

Now the object of the invention is to provide a film element which affords an optically variable colored impression and is inexpensive to produce.

That object is attained by a film element having a replication layer, in which an optically active surface structure is shaped, wherein the surface structure is formed in at least a first region of the film element by a first diffractive surface relief comprising a plurality of successive elements following a first envelope curve, wherein the elements respectively comprise an element surface arranged substantially parallel to a base surface and at least one flank adjoining the adjacent element surface or surfaces, the element surfaces of adjacent elements are spaced in a direction perpendicular to the base plane, with a first optical spacing or a plurality of the first optical spacing, wherein the first optical spacing is between 150 nm and 800 nm, preferably between 150 nm and 400 nm, the first envelope curve has a spatial frequency of between 100 L/mm and 2000 L/mm, preferably between 200 L/mm and 1000 L/mm, and an optical depth of more than 450 nm and the relief shape and the spatial frequency of the envelope curve are so selected that the incident light is diffracted into one or more first directions to represent a first item of information, the color value of which is further determined by the first optical spacing.

The invention can provide security features which cannot be imitated even by holographic methods, for example by means of a volume hologram. The security features afforded by a film element according to the invention can thus—as clearly set forth hereinafter—afford for example a full-colored, optically variable impression or an optically variable impression exhibiting a color change. Such effects also cannot be imitated by the combination of a thin film layer system with a diffractive structure. Moreover the film element according to the invention can be produced with fewer process steps and without the use of expensive materials. Thus for example markedly fewer process steps are necessary than in the production of a security element which includes a thin film layer system. The invention provides a film element which has an optically variable impression which can only be imitated with difficulty, and moreover is highly inexpensive to produce.

The substructuring of the envelope curve, by which the first item of information is generated substantially by diffraction of the light in the first or minus-first diffraction order means that the color value of the diffracted light is additionally influenced by interference, resulting in a colored optically variable impression which differs significantly from a normal rainbow impression.

The terms optical spacing and optical depth are used to denote the geometrical spacing or geometrical depth respectively corrected by the optical refractive index, that is to say multiplied by the refractive index, in which case the refractive index is related to the material which in the case of a film element operating in a reflection mode, in the direction of the incident light, is provided above the surface of the replication layer in which the surface relief is shaped or above a reflection layer applied to that surface. If the light is incident on that surface or on the reflection layer from the side of the replication layer the refractive index of the replication layer is decisive in determining the geometrical spacing from the optical spacing. In the case of a film element operating in the transmission mode the optical spacing and the optical depth result from the geometrical spacing or the geometrical depth respectively multiplied by the difference in the refractive indices of the layers adjoining the surface relief.

Advantageous configurations of the invention are recited in the appendant claims.

In accordance with a preferred embodiment of the invention the envelope curve has an asymmetric relief profile. That makes it possible to generate numerous, highly attractive optical effects, in which a color/tilt effect or a change in the color impression is generated, upon rotation of the film element, in such a way that a previously colorlessly (reflectively) appearing region or holographic representation appears in a predefined color value upon rotation of the film element. In addition it is also possible in that way to generate motion effects in which the color of a (three-dimensionally appearing) object changes in the course of the movement.

An asymmetric relief profile has an asymmetric, that is to say non-symmetric relief shape. In that respect the degree of asymmetry is preferably determined by the amount by which the spacing from a local maximum of the relief profile to the nearest local minimum in the one direction differs from the spacing to the nearest local minimum in the opposite direction. The spacing between two adjacent local minima of the relief profile is for example d. The spacing of the one local minimum to the local maximum of the relief profile, that is between the two local minima, is for example d1, that from the other local minimum to the local maximum therebetween is d2, wherein d=d1+d2. The ratio of the larger of the two spacings d1 and d2 to the spacing d determines the symmetry factor S, wherein in the case in which d1≤d2, S=d1:d, and in the other case S=d2:d. If the relief profile is a periodic relief profile d corresponds to the period length, that is to say the spacing in which the (similar) structure elements of which the relief profile is composed are repeated. Preferably such an asymmetric relief profile is composed of structure elements of a triangular shape or structure elements approximating to a triangle, which are determined by the geometrical factors d, S and by the optical depth of the relief structure. In that way the envelope curve can be defined by those parameters.

Preferably in that respect the symmetry factor S is in the range of between 70% and 100%, further preferably in the range of between 85% and 95%. When those conditions are observed a clear easily remembered color change effect is exhibited, with a high degree of purity of the colors, when the film element is rotated.

In addition it is also possible for the envelope curve to be formed by a computer-generated diffractive structure, for example a Kinegram®, which presents different representations in dependence on the viewing angle. Preferably the envelope curve has a first constant spatial frequency in a first spatial direction. The envelope curve can thus also involve a one-dimensional grating. When the film element is rotated, such structures also present color change effects which markedly differ from the color effects which can be achieved by thin film layer systems and from a normal rainbow color impression. In a preferred embodiment of the invention the envelope curve has a second constant spatial frequency differing from the first constant spatial frequency, in a second spatial direction differing from the first spatial direction. In that way also it is possible by means of the invention to produce security elements which give a different color impression in dependence on the angle of rotation.

Preferably the first region has a first dimension of more than 50 μm, in particular more than 100 μm, in at least one direction. The element surfaces are preferably selected to be greater than 100 nm and preferably occupy between 10% and 50%, in particular between 10% and 33%, of each element. The envelope curve is preferably of an optical depth of between 3 times and 10 times the first optical spacing, wherein in the case of a film element operating in the reflection mode, the first optical spacing is to correspond approximately to half the wavelength of the color value with a given viewing direction while in operation in the transmission mode it is to correspond approximately to the wavelength of that color value. The envelope curve further preferably is of an optical depth of less than four times the optical spacing. By the choice of such parameters it is possible to improve the representation of the first item of information and to avoid the substructuring adversely influencing the representation of the first item of information.

Arranging the element surfaces substantially parallel to a base surface means on the one hand that the element surfaces are arranged in substantially mutually parallel relationship. In a first embodiment the base surface is further parallel to the plane defined by the second surface, opposite to the first surface of the replication layer, of the replication layer (underside of the replication layer). That means that the element surfaces are then arranged substantially parallel to the underside of the replication layer. Further advantageous effects however can be achieved by the base surface not being arranged parallel to the underside of the replication layer and thus including an angle of inclination, preferably an angle of inclination of more than 5°, further preferably more than 10°, with the underside of the replication layer. The optical appearance as described hereinafter can be further altered by altering the orientation of that angle of inclination. In addition it has been found that the color yield can be increased by such an inclination of the element surfaces with respect to the underside and an individual color comprising a primary color of high intensity can be achieved, accompanied by one or more secondary colors of low intensity. It is possible to achieve a particularly high luminance which is higher than that of a volume hologram. Such an inclination of the element surfaces can be achieved for example by the use of prism couplers and a hologram recorded in a dichromatic gelatin as an intermediate copy for production of the (surface relief) master. In addition, such inclination of the element surfaces can also be implemented by a corresponding inclination of the object which is irradiated with one of the mutually superposed laser beams in production of that intermediate copy, preferably combined with a prism coupler.

Preferably the base plane corresponds to the base surface, that is to say the spacing of the substantially mutually parallel element surfaces is determined—as usual—by the spacing along a straight line perpendicular to the base surfaces.

In accordance with a further embodiment however it is also possible here for the base plane to be determined by the second surface of the replication layer, that is opposite to the first surface thereof, that is to say the underside of the replication layer, in particular if the base surface includes an angle of inclination with the underside.

In a preferred embodiment of the invention the first region is shaped in pattern form, in particular in the form of a symbol or a portrait. That further improves protection from imitations.

In addition it is also possible, in the one or more first regions, for the material which determines the optical spacing and the optical depth and which is provided in relation to the incident light above the surface structure or above the reflection layer (see above) to be applied only in pattern form on the first region or regions or for different materials with different refractive indices to be applied in region-wise fashion. Thus it is possible to achieve a different optical spacing or a different optical depth in the at least one first region by region-wise printing of material thereon with a different refractive index in region-wise manner in the at least one first region, and in that way to provide that a different color impression is presented in at least one first region in region-wise fashion. In that respect the regions are preferably shaped in pattern form, in particular in the form of a symbol or a portrait.

It is of particular advantage if in at least one second region the surface structure is formed by a second surface relief which differs from the first surface relief and which represents a second item of information. By the application of that principle it is possible to generate a plurality of security features which cannot be imitated or which can be imitated only with very great difficulty by means of other technologies and which present optically surprising and easily remembered effects. It is further advantageous in that respect if the at least one second region adjoins the at least one first region or the first regions. It is further advantageous if the first region completely encloses the second region or the second region completely encloses the first region or regions. A particularly high degree of protection from imitation can further be achieved if the first and/or the second region is shaped in pattern form, in particular in the form of a third or fourth item of information respectively, and/or the second and third items of information and/or the third and fourth items of information represent mutually supplemental items of information. A particular high level of protection from manipulation is achieved by those items of information which are generated by various effects engaging into each other.

In accordance with a further preferred embodiment of the invention provided in the at least one second region is a second surface relief and/or a layer or a layer configuration which present a different color effect from the first surface structure. The layer or layer configuration in the at least one second region can be here for example a thin film layer system, a crosslinked cholesteric liquid crystal layer, a zero-order diffractive structure or a diffractive structure presenting a rainbow effect, for example a diffraction grating with a spatial frequency of between 100 L/mm and 2000 L/mm. Thus it is for example possible to provide self-referencing color surfaces. In a first viewing position the color in the first region or regions and the color in the second region or regions are the same but in a second viewing position they differ. Easily remembered security features can also be made available in that way by means of the invention.

The second surface relief is preferably a diffractive surface relief, in particular a diffraction grating, a Kinegram® or a hologram. It is further also possible for the second surface relief to be an achromatic surface relief, in particular a matt structure, a macrostructure or a blaze grating. The optical effect thus generated by the first region is very easily remembered and cannot be imitated, or can be imitated only with very great difficulty, by holographic methods, for example by means of a volume hologram. A single layer of the film element in various regions has markedly different optical effects which as such are novel or which can be generated only by different production technologies and the superimposition of a plurality of different layers.

In accordance with a further preferred embodiment of the invention the second surface relief also comprises a plurality of successive elements following a second envelope curve, wherein the elements respectively comprise an element surface arranged substantially parallel to a base surface and at least one flank adjoining the adjacent element surface or surfaces, the element surfaces of adjacent elements are spaced in a direction perpendicular to the base plane, with a second optical spacing or a plurality of the second optical spacing, wherein the second optical spacing has an optically active depth of between 150 nm and 800 nm, preferably between 150 nm and 400 nm, the second envelope curve has a spatial frequency of between 100 L/mm and 2000 L/mm and an optical depth of more than 450 nm and the relief shape and spatial frequency of the second envelope curve are so selected that the incident light is diffracted in one or more second directions to represent the second item of information, the color value of which is further determined by the second spacing.

In that respect it is possible on the one hand to achieve interesting and attractive effects in that the first optical spacing differs from the second optical spacing by more than 15 nm, preferably by more than 25 nm, in which respect it is also possible in that case for the first and second envelope curves as such to coincide. In that way different color effects can be generated in mutually juxtaposed relationship and, as described hereinafter, it is also possible to generate a multi-color hologram, which is not possible as such by holographic technology, for example by means of a volume hologram.

In a further preferred embodiment the first envelope curve and the second envelope curve involve different envelope curves which diffract the incident light in different directions. It is possible in that case for the first spacing and the second spacing to be the same but it is also possible for the first spacing and the second spacing not to be the same. Preferably in that case the spatial frequency and/or the azimuth angle of the first and second envelope curves differ from each other, in particular it is advantageous if the azimuth angles of the first and second curves are oriented at a right angle to each other. It is possible in that way to generate interesting optical effects, as is described in greater detail hereinafter.

It is particularly advantageous if the relief shape of the first and second envelope curves differs, in particular if the first envelope curve is symmetrical and the second envelope curve is asymmetric or vice-versa, or the first and second envelope curves are of relief shapes which are asymmetric in mirror-inverted relationship with each other. In that way upon rotation the regions present different color change effects, by means of which particularly easily remembered security features can be provided.

In accordance with a further preferred embodiment of the invention the first region and/or the second region respectively comprise two or more first and second subregions respectively, which are of a strip-shaped configuration. In that respect strip-shaped configuration is used to mean a configuration in which the subregions are of a length which is markedly greater (at least a factor of 2, preferably a factor of 10), than width. The centroid lines of such a strip-shaped subregion can in that case be in the form of a straight line but they can also be of another configuration, for example the configuration of a wiggly line, a zig zag line or a circular ring. Preferably the first and second subregions are of a width of less than 300 μm and are arranged in accordance with a first and a second raster respectively. The raster width of the first and second rasters is preferably less than 200 μm and the strip-shaped subregions are preferably oriented in mutually parallel relationship.

In a further preferred embodiment of the invention both the first region and also the second region comprise strip-shaped subregions which are interwoven or internested so that different items of information which are afforded by the first and second surface relief respectively can be rendered visible to the viewer in one and the same surface region.

In a further preferred embodiment of the invention the width of the strip-shaped subregions is modulated to provide a gray scale image.

In a further preferred embodiment of the invention a region of the surface structure is subdivided into a plurality of mutually adjoining domains which are of a dimension of less than 300 μm in at least one direction (below the resolution limit of the human eye at a normal viewing distance), wherein provided in the domains of a first group of domains is a first region, that is to say a region having the first surface relief, and a second region, that is to say a region having a second surface relief. It is possible in that respect for each of the domains to have a first region and a second region. In addition it is also possible that a first region but not a second region is respectively provided in the domains of a second group of domains and a second region but not a first region is respectively provided in the domains of a third group of domains.

The region thus presents an optically variable security feature which exhibits different items of information in different color impressions depending on the respective viewing direction. In that respect it is possible for the first and second spacings to differ from each other and for the first and second envelope curves to be the same or not to be the same so that a multi-colored, optically variable representation is shown in the region, for the human viewer. In that way it is for example possible for the impression of a multi-colored optically variable representation to be afforded for the viewer in the region.

In addition it is also possible for domains to have further regions having a surface structure which corresponds to the surface structures of the first and second regions and which is identical in its envelope curve to the first and second envelope curves and differs in its optical spacing from the first and second optical spacings. That makes it possible to represent further (primary) color values.

Preferably in that case the surface component of the first and/or second regions and/or the one or more further regions in the domains is varied, whereby the number of color values which can be represented in the region can be increased. Preferably the first and second envelope curves further differ from each other and diffract the incident light in first and second directions differing from each other. That makes it possible to achieve interesting motion effects in respect of which not just the position, shape or size of an object changes upon rotation or tilting, but the color value thereof also dynamically changes.

In a further preferred embodiment of the invention the domains further have third and fourth regions, in each of which a surface profile corresponding to the first surface profile or the second surface profile respectively forms the surface structure. The third and fourth surface profiles only differ from the first surface profile and the second surface profile insofar as the respective spacing thereof differs from the first spacing and the second spacing respectively. In addition it is also possible for the domains to have still further regions whose surface profile, like the third and fourth regions, differ in the respective spacing from the first and second surface profile respectively or which have an envelope curve differing from the first and second envelope curves and are otherwise substructured like the first and second surface profiles. Those measures make it possible to generate the impression of a full-color hologram in the region, for the human viewer. That impression cannot be imitated by holographic methods, for example by means of a volume hologram.

In a further preferred embodiment of the invention a reflection layer, in particular a metallic reflection layer, is applied to the first surface of the replication layer. It is however further possible for an optical separation layer, in particular an HRI layer, to be applied to the first surface of the replication layer so that the optical effect generated by the surface structure is visible not only in reflection but also in transmission. In that respect it is possible for the thickness of the optical separation layer to be less or also more than the first or the second optical spacing. In addition it is also possible for the replication layer to already have a high refractive index, for example by nano particles being introduced into the replication lacquer or by a corresponding replication lacquer with a high refractive index being used. In addition it is also possible for the above-listed variants to be combined together and thus for example to provide an HRI layer and a metal layer on the surface of the replication layer. Furthermore it is also possible for the reflection layer or the optical separation layer to be respectively applied only in region-wise fashion in a patterned configuration on the first surface of the replication layer. In that respect, by suitable patterned application of one of more of the above-listed coatings or by suitable patterned application or doping of the replication layer, it is possible in particular to alter the refractive index which is determining in respect of the first and second optical spacings respectively in region-wise fashion, and thus to achieve the effects already described hereinbefore.

The film element is preferably a lamination film or a transfer film further having a carrier film arranged on the side of the second surface of the replication layer, that is remote from the first surface. In addition it is also possible for the film element to be arranged on a carrier substrate of a security document in such a way that it at least partially covers over a window-shaped opening in the carrier substrate. As already stated above the optical effect generated by the film element, with a suitable configuration, can be viewed by the human observer not only in a reflection mode but also in a transmission mode so that this affords a security feature with a high level of protection from imitation.

The invention is described by way of example hereinafter by means of a number of embodiments with reference to the accompanying drawings:

DETAILED DESCRIPTION OF THE INVENTION

Figure 1:
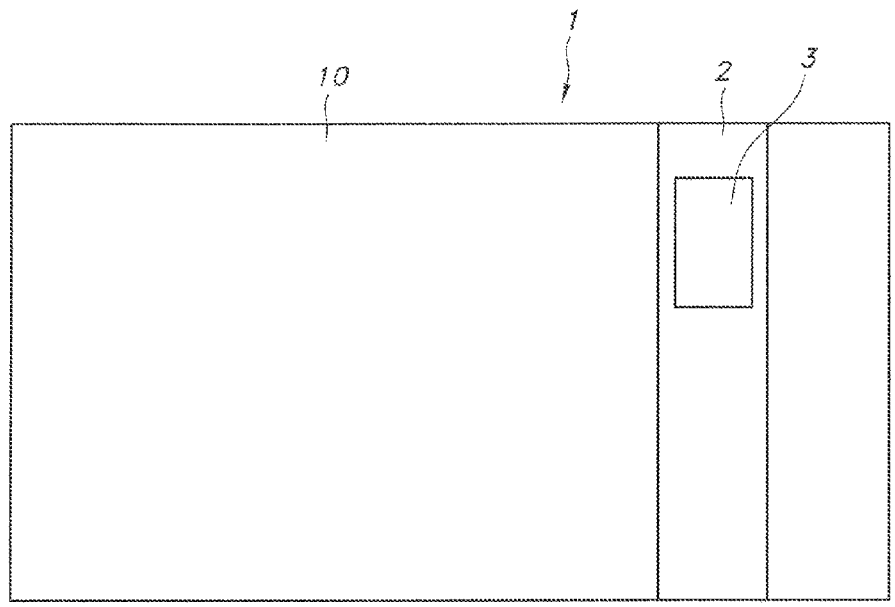
FIG. 1 shows a plan view of a security element having a film element according to the invention.

FIG. 1 shows a security document 1 comprising a carrier substrate 10 and a film element 2 applied thereto. The security document 1 is for example a bank note, a money substitute, an identification document or a certificate, label or ticket, for example for product protection. It is also possible for the security document 1 to be a credit card, bankcard or the like. In addition it is also possible for the film element to be applied to a packaging material or a wrapper for a product or the product itself.

The carrier substrate 10 preferably comprises a paper substrate, for example of a thickness of between 50 and 100 µm. It is however also possible for the carrier substrate 10 to comprise a plastic material or a composite material comprising one or more paper and/or plastic layers. The carrier substrate 10 further preferably has one or more color layers applied by printing thereto and is provided with one or more further security elements. As indicated in FIG. 1 the film element 2 is shaped in a strip form and extends over the entire width of the carrier substrate 10. It is however also possible for the film element 2 to be formed in a patch shape or also not to extend over the entire width of the carrier substrate 10. The film element 2 has a region 3 in which an optically active surface structure is shaped into a replication layer of the film element 2. Preferably in that case the region 3 is arranged within a window-shaped opening introduced into the carrier substrate 10 or at least partially covers over such an opening.

In addition it is also possible for the film element 2, besides the region 3, also to have one or more further regions in which further optical security features are generated for the viewer and which for example also has an optically active surface structure shaped into a replication layer of the film element 2, a thin film layer system, a crosslinked liquid crystal layer and/or a layer containing optically variable pigments. As already described hereinbefore it is possible in that way to provide regions in which different color effects cooperate to generate a security feature, for example in the form of self-referencing color surfaces. In addition it is also possible for the film element 2 to further have one or more color layers which are shaped for example in the form of a logo or an image or picture and which are provided beside or in overlapping relationship with the region 3, preferably for providing a common security feature.

Figure 2:
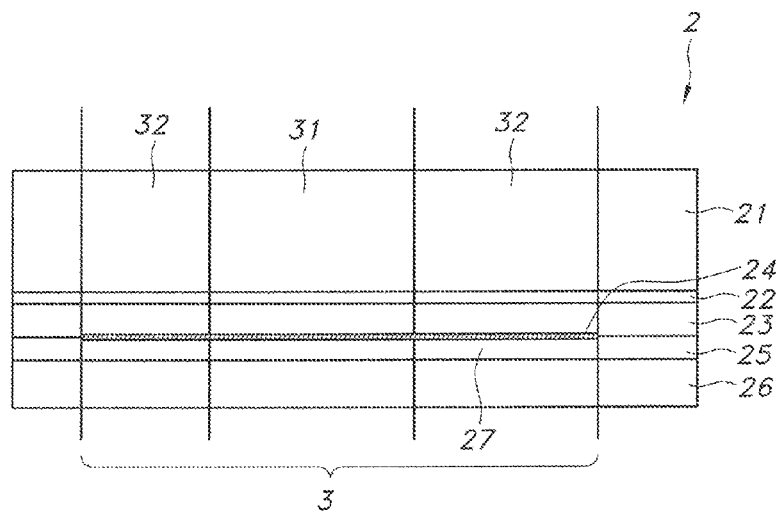
FIG. 2 shows a cross-section through the film element of FIG. 1.

The structure of the film element 2 is described hereinafter with reference to FIGS. 2 through 4.

The film element 2 can be a portion of a lamination film applied to the carrier substrate 10 or a portion of a superimposition layer of a transfer film which has been embossed on the carrier substrate 10.

The film element 2 has a carrier film 21, an optional bonding primer layer 22, a replication layer 23, a reflection layer 24 and a protective lacquer layer 25 as well as an adhesive layer 26. It would also be possible to dispense with the bonding primer layer 22 and the protective lacquer layer 25. It is also possible for the film element 2, besides those layers, also to have one or more further layers which alter the optical appearance of the film element 2 in the region 3 or improve the adhesion between the layers.

If the film element 2 involves the transfer layer of a transfer film it would also be possible to dispense with the carrier film 21. In that case it is advantageous to provide a protective lacquer layer instead of the bonding primer layer 22. In that case a release layer would preferably also be provided between a carrier film of the transfer film and the layer stack consisting of the layers 23 through 26, the release layer facilitating release of the transfer layer from the carrier film.

The carrier film 21 is a plastic film, for example of PET or BOPP, of a thickness of between 8 and 24 µm. The replication layer 23 is a layer of a thermoplastic replication lacquer or a UV hardenable replication lacquer of a layer thickness of between 2 and 5 µm. In addition it is also possible for the replication layer 23 to be a plastic film, for example a plastic film used as the carrier film 21.

The adhesive layer 26 is a layer comprising a thermally activatable hot melt adhesive. It is however also possible for the adhesive layer 26 to comprise a cold adhesive or a UV activatable adhesive.

An optically active surface structure 27 is shaped in the replication layer 23 in the region 3. In that case the step of shaping the surface structure 27 is preferably effected by means of thermal replication, by a procedure whereby a heated embossing tool, for example an embossing roller, is pressed against the surface of the replication layer 23, that is oriented in the direction of the adhesive layer 26, and the surface structure 27 is thus introduced into that surface of the (thermoplastic) replication layer 23 in the region 3 by means of heat and pressure. In addition it is also possible for the surface structure 27 to be introduced into the surface of the replication layer by means of UV replication. In that case the surface structure is preferably shaped in the replication layer 23 directly after application of the replication layer 23 by means of a tool and the replication layer is preferably hardened in parallel relationship therewith by UV irradiation. It is also possible for the surface structure 27 to be shaped in the replication layer 23 by means of ablation.

In addition it is also possible for an HRI material to be further applied region-wise to the replication layer, for example in a patterned configuration, by a printing method. It is also possible for the surface structure 27 to be designed for viewing in the transillumination mode and thus for a window-shaped opening to be provided in the substrate 10 at least in the region 3 or for the substrate 10 to be transparent in that region.

The region 3 is subdivided into a plurality of regions 31, 32, 33 and 34 in which the surface structure 27 is respectively formed by a different surface relief. Thus that gives the optical appearance shown in FIG. 4 for example for the human viewer, when viewing the region 3. Thus the region 31 is shaped for example in the form of a tree 31 and covered with a first surface relief implementing a holographic representation of a tree in a green color. The region 32 is shaped in the form of a background to the region 31 and completely encloses the region 31. In the region 32 the surface structure 27 is formed by a second surface relief which generates a holographically acting background to the holographic representation afforded by the region 31, more specifically in a color contrasting with the region 31, for example in a blue color. The regions 33 are shaped in the form of symbols, here in the form of the digits "100". In the regions 33 the surface structure 27 is formed by a third surface relief which causes the regions 33 to appear achromatically white from a central viewing position. The regions 34 respectively enclose the regions 33 and respectively form an edge region in relation to the regions 33. In the regions 34 the surface structure 27 is formed by a fourth surface relief which appears in rainbow colors from a central viewing position and upon rotation of the security element 2 simulates a substantially achromatic motion effect, by which the digits "100" appear to widen and contract again upon rotation.

The structure of the first surface relief which is shaped in the region 31 will now be described hereinafter by way of example with reference to FIG. 3.

Figure 3:
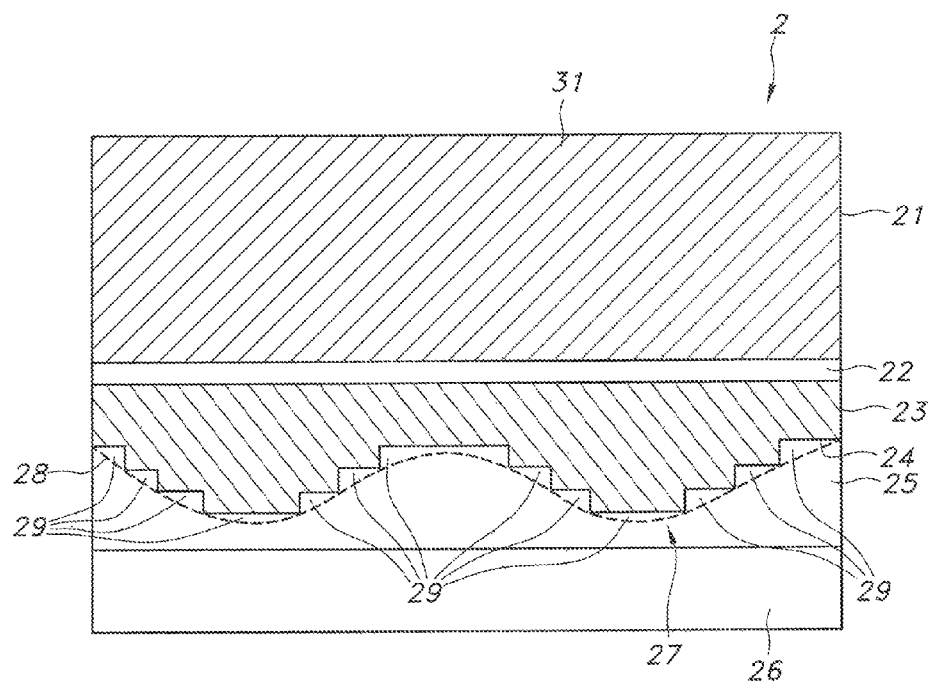
FIG. 3 shows a diagrammatic sectional view, not true to scale, of a region of the film element of FIG. 2.
Figure 4:
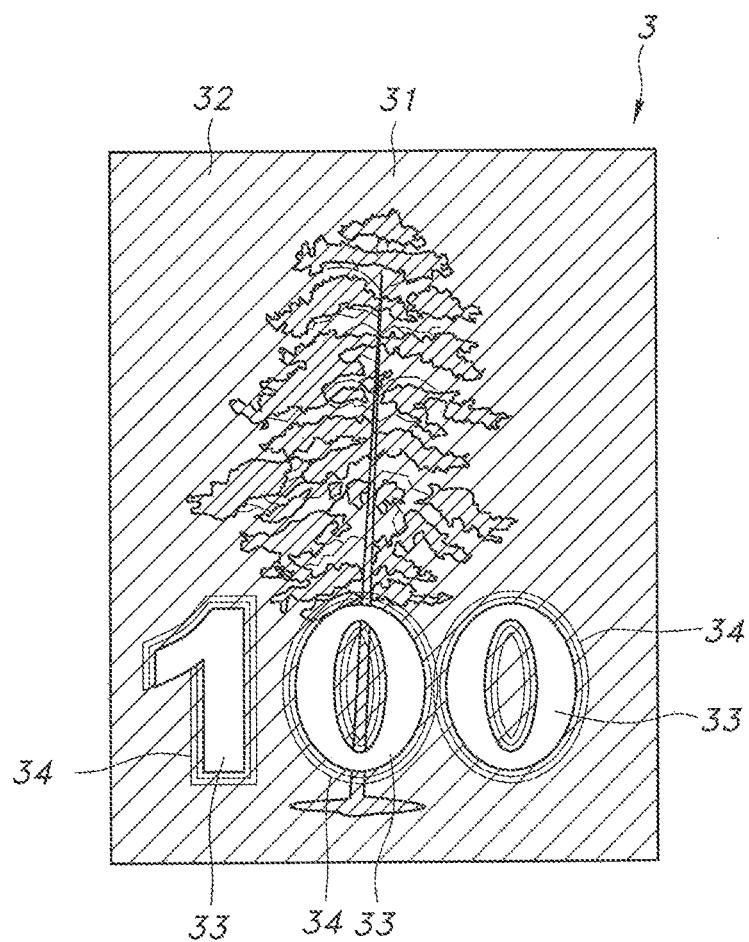
FIG. 4 shows a plan view of a region of the film element of FIG. 2

FIG. 3 shows a representation, not true to scale, of a section through the film element 2 in a subregion of the region 31. FIG. 3 shows the film element 2 with the carrier film 21, the bonding primer layer 22, the replication layer 23, the reflection layer 24, the protective lacquer layer 25 and the adhesive layer 26. In this case it is also possible to dispense with the protective lacquer layer 25 or it is possible for the protective lacquer layer 25 and the adhesive layer 26 to comprise the same material. The surface structure 27 is formed in the region 31 by a diffractive surface relief which—as shown in FIG. 3—comprises a plurality of successive elements which follow an envelope curve 28 and which respectively comprise element surfaces 29 arranged substantially parallel to a base surface and at least one flank adjoining the adjacent element surfaces 29. The element surfaces 29 are accordingly arranged in substantially mutually parallel relationship. In the embodiment in FIG. 3—as shown in FIG. 3—the base surface is parallel to the underside of the replication layer 23 and thus parallel to the underside of the film element 2 and parallel to the carrier film 21. It is however also possible for the base surfaces and therewith the element surfaces 29 to include an angle of inclination with the underside of the replication layer 25, whereby further optical effects can be produced, as described hereinafter.

In this case the optical depth of the envelope curve is preferably between 3 and 4 times the optical spacing between the element surfaces. The optical spacing between the substantially mutually parallel element surfaces is in this case determined in the usual way, that is to say by the spacing along the surface normals perpendicular to the element surfaces. The envelope curve 28 shown in FIG. 3 by a dotted line has in this embodiment a spatial frequency of between 100 L/mm and 1000 L/mm and thus diffracts the light predominantly into the first or minus-first diffraction order. The structure elements of the envelope curve 28 or the local orientation and local spatial frequency thereof within the above-described spatial frequency range are in this case so selected that—as described hereinbefore—they generate a holographic representation of a tree. The envelope curve 28 is a relief profile, for example a rainbow hologram, a holographic grating produced by the interference of two or more light beams, a holographic grating generated by interference of a reference beam and a beam reflected by an object, or a hologram produced by optical copying of a master hologram. In addition that relief profile can also involve a mathematical function which represents such a holographic relief profile and which is used to calculate the surface structure which is ultimately implemented by means of electron beam lithography. The envelope curve 28 in the embodiment of FIG. 3 is thus for example a relief profile corresponding to a rainbow hologram, for example a computer-generated hologram (for example a dot matrix hologram) of a tree. The relief profile used for the envelope curve is further modified in relation to the usual relief profile of a rainbow hologram insofar as it is stretched by the factor of between 3 and 10 in the direction perpendicular to the base plane so that the envelope curve is no longer of a profile depth of between 0.1 and 0.3 µm, as in the case of a usual rainbow hologram, but involves a markedly higher profile depth of between 1 and 2 µm. As shown in FIG. 3 the envelope curve 28 is further substructured by the element surfaces 29, whereby the color value of the diffracted light is further influenced by interference. The element surfaces 29 in this case are spaced from each other at a first optical spacing or a multiple of the first optical spacing, wherein the first geometrical spacing afforded by division by the refractive index is between 50 nm and 400 nm, preferably between 80 nm and 200 nm, and in this embodiment 80 nm for a blue color shade, with the provision of a ZnS layer, 220 nm for a red color shade in normal plastic material and 325 nm for a red color shade in embodiments in relation to air.

The second surface relief shaped in the region 32 is shaped similarly to the first surface relief illustrated by FIG. 3, with the difference that the envelope curve 28 is formed by a relief profile which generates the above-discussed holographic background information by diffraction into the ±first diffraction order. Moreover the substructuring of the envelope curve differs from that of the first surface relief, insofar as the element surfaces are spaced from each other at a different optical spacing, here for example an optical spacing of 325 nm, and thus the color value of the diffracted light is influenced by interference in a different way, thereby giving the different color impression of the regions 31 and 32.

The third surface relief shaped in the regions 33 involves a matt structure or a blaze grating, for example with a spatial frequency of 1000 L/mm and of a substantially triangular profile shape.

The fourth surface relief shaped in the regions 34 involves a Kinegram® which provides the above-described motion effect.

The surface structure 27 is thus distinguished in particular in that it is formed in the regions 31 through 34 by entirely different surface reliefs which markedly differ from each other in particular in respect of their profile depth. Thus in the regions 31 or 32 the surface structure 27 has a surface relief having an optically active relief depth of between 1 and 2 µm, whereas the surface structure 27 in the regions 33 and 34 has an optically active relief depth of between 0.1 and 0.3 µm.

A single replication tool is used to shape the surface structure 27 in the replication layer 23. To produce the replication tool the surface relief 27 is calculated in accordance with the above-discussed principles and is then introduced into a carrier layer, for example a thin glass layer, by means of electron beam lithography.

A further embodiment of the invention will now be described with reference to FIG. 5.

Figure 5:
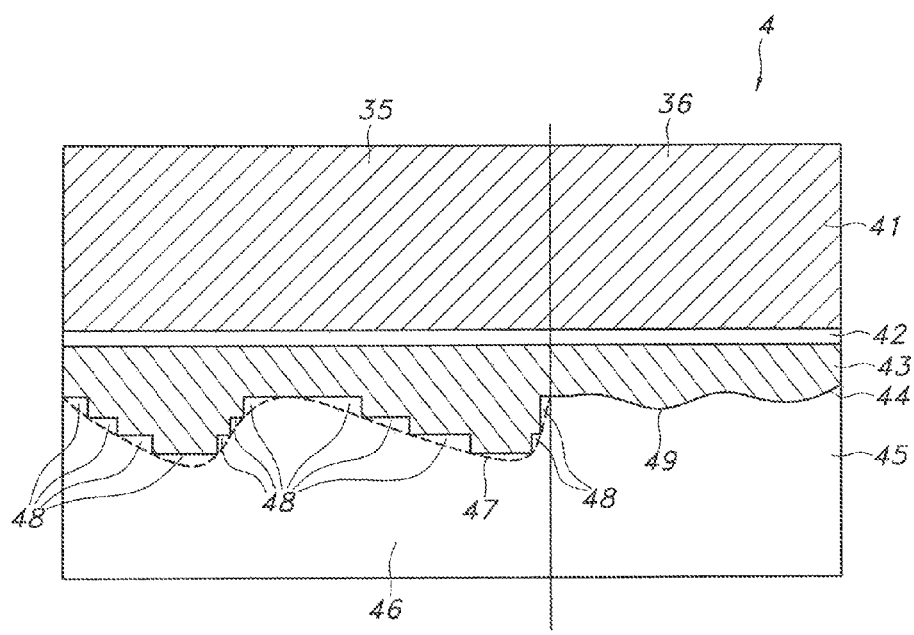
FIG. 5 shows a diagrammatic sectional view, not true to scale, of a film element according to the invention for a further embodiment of the invention.

FIG. 5 shows a sectional view, not true to scale, of a subregion of a film element 4. In the FIG. 5 embodiment the film element 4 is formed by a transfer film, in particular a hot embossing film. It is however also possible for the film element 4 to be a lamination film or a part, applied to a carrier substrate, of a lamination or transfer film. The film element 4 has a carrier layer 41, a release and/or protective lacquer layer 42, a replication layer 43, a reflection layer 44 and an adhesive layer 45. The carrier film 41 is a plastic film, for example a PET film of a thickness of between 12 and 56 µm. As already described hereinbefore with reference to the replication layer 23, the replication layer 43 comprises a replication lacquer layer comprising a thermoplastic lacquer or a UV-hardening lacquer. The reflection layer 44 is a thin metallic layer, for example of aluminum, silver, gold, copper or an alloy of those metals. It is also possible that, instead of the reflection layer 44, an optical separation layer, for example an HRI layer, in particular an inorganic HRI layer (HRI—high refraction index) is applied to the replication layer 43, which is of a thickness which in a first embodiment is less than the first and/or second optical spacing and in a second embodiment is thicker than the first and/or optical spacing or corresponds thereto. In addition it is also possible that the reflection layer 44 comprises an HRI layer and a metallic layer, wherein preferably the replication layer 43 is firstly coated with the HRI layer and then the metal layer is applied to the HRI layer.

Both the reflection layer 44 and also the optical separation layer can in that case be applied partially and in patterned form to the replication layer 43. That provides for example that the light in different regions passes through a medium with a differing refractive index and thus the optical spacing which is dependent on the refractive index differs in region-wise manner.

FIG. 5 now further shows a respective subregion of two mutually adjoining regions 35 and 36. In the regions 35 and 36, two different surface reliefs, namely a surface relief 46 and a surface relief 49, are shaped in the replication layer 43. As indicated in FIG. 5 the surface relief 46 is formed by a plurality of successive elements which follow an envelope curve 47 and which each comprise an element surface 48 arranged substantially parallel to a base surface and at least one flank adjoining the adjacent element surface or surfaces 48. The envelope curve 47 is an asymmetric envelope curve, that is to say the structure elements of which the envelope curve 47 is composed are of an asymmetric cross-section. In the simplest case the envelope curve 47 is a regular grating composed of triangular structure elements, with a spatial frequency of between 100 L/mm and 2000 L/mm, preferably between 100 L/mm and 1000 L/mm, and with a symmetry factor in the range of between 70% and 100%, preferably between 85% and 95%. As indicated in FIG. 5 the envelope curve 47 is substructured by the element surfaces 48, more specifically in such a way that the adjacent element surfaces 48 are spaced in a direction perpendicular to the base plane at a spacing or a multiple of a spacing which is of an optically active depth of between 150 nm and 400 nm. Thus in this case also the light diffracted by the surface relief 46 is superimposed with interference effects caused by the substructuring, which influence the color value of the light diffracted by the surface relief. That kind of surface relief has a large number of interesting and attractive properties: in dependence on the viewing or illumination angle within the base plane and under some circumstances in dependence on the tilt angle, that is to say the angle perpendicularly to the base plane, that surface relief presents different colors. If for example the envelope curve is a one-dimensional grating the color impression is determined by the angular position relative to the azimuth angle of the grating. In addition that kind of surface relief is distinguished by a particularly high light strength and separation sharpness between the color values generated by the various angular positions, which are much higher than the values which can be achieved by a monochromatic volume hologram.

Thus it is possible for example for the surface relief 46 to have diffraction-optically a holographic representation of an object, for example a portrait, in which case the light diffracted by the surface relief 46, due to the above-discussed effects in the first and minus-first diffraction order, has different color values and thus the object also changes its color value upon rotation through 180°. Such an effect cannot be achieved by a volume hologram.

Adjoining the surface relief 46 is the surface relief 49 which is shaped into the replication layer 43 in the region 36. The surface relief 49 is an optically active surface relief which is not substructured by element surfaces. The surface relief 49 is thus a diffraction grating, a hologram or also an achromatic surface relief, for example a matt structure, a macrostructure or a blaze grating. As indicated in FIG. 5 in this case the relief depths of the relief profile 49 and the relief profile 46 differ markedly from each other.

Figure 6A:
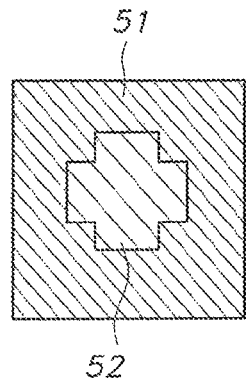
FIG. 6a shows a plan view of a region of a film element according to the invention with a first light incidence direction.
Figure 6B:
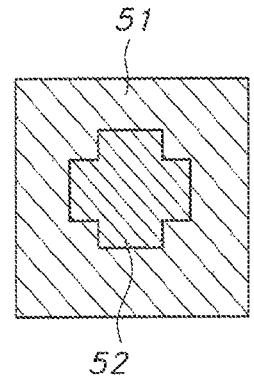
FIG. 6b shows a plan view of the film element of FIG. 6a with a second light incidence direction.

Interesting optical effects can already be embodied when selecting simple relief profiles for the envelope curve 47—in particular in regard to a combination with similar structures or with relief structures corresponding to the relief structures 49—:

Thus FIGS. 6a and 6b show a plan view of a portion of a film element, wherein a first surface relief is shaped in a replication layer in a region 51 and a second surface relief is shaped therein in the region 52. The first and second surface reliefs are shaped like the surface relief 46 of FIG. 5. A one-dimensional grating is used as the envelope curve 47. The surface reliefs in the regions 51 and 52 only differ from each other in that the azimuth angles of their envelope curves are rotated through 180° relative to each other. The envelope curves are thus characterized for example by the following geometrical factors: asymmetric diffraction grating (symmetry factor: 100%) with a period of 4 µm (250 L/mm). The spacing between the element surfaces is 190 nm (optical spacing 285 nm; refractive index of the replication layer: 1.5). The geometric profile depth of the surface relief is 1.14 µm, that is to say 6 times the geometrical spacing. When viewing from a standard viewing position (FIG. 6a) the region 52 appears in a red color and the region 51 in green. When the film element is rotated through 180° (FIG. 6b) the region 52 appears in a green color to the human viewer and the region 51 appears red.

Figure 7A:
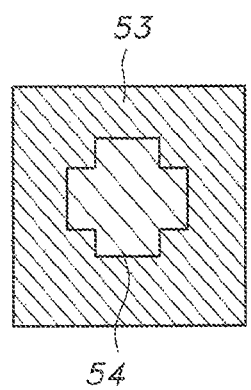
FIG. 7a shows a plan view onto a region of a film element according to the invention with a first light incidence direction.
Figure 7B:
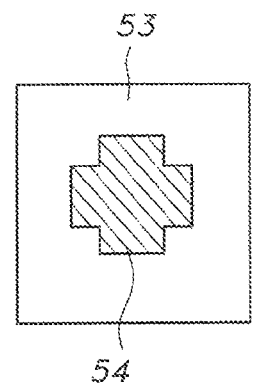
FIG. 7b shows a plan view onto the region of FIG. 7a with a second light incidence direction.

In the embodiment of FIG. 7a and FIG. 7b, shaped in the regions 53 and 54 of a film element are different surface profiles which are each shaped like the surface profile 46. The envelope curves of the surface profile shaped into the region 54 is a simple linear grating composed of asymmetric structure elements, for example triangular structure elements. The envelope curve of the surface relief shaped in the region 53 is that of an anisotropic, preferably holographically produced matt structure, the structure elements of which are also of an asymmetric configuration and directedly scatter the incident light. The envelope curves include an azimuth angle of 0°. The optical spacing between the element surfaces in the region 54 is 285 nm (geometrical spacing 190 nm). The optical spacing between the element surfaces in the region 53 is about 315 nm (geometrical spacing 210 nm).

When viewing from the standard viewing position (FIG. 7a) the region 54 appears in a red color whereas the region 53 appears green. When the film element is rotated through 180° the region 54 appears green whereas the region 53 appears colorless.

Figure 8A:
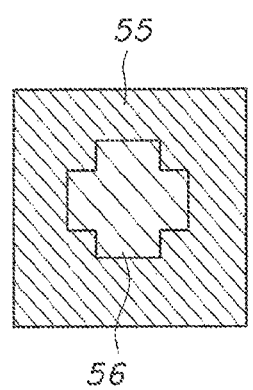
FIG. 8a shows a plan view onto a region of a film element according to the invention with a first light incidence direction.
Figure 8B:
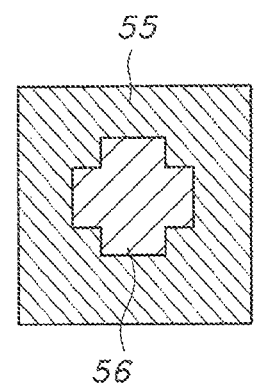
FIG. 8b shows a plan view onto the region of FIG. 8a with a second light incidence direction.

FIGS. 8a and 8b show a further embodiment of a film element according to the invention in which case a relief profile as shown in FIG. 3 with a symmetrical envelope curve is shaped in a region 55 and a relief profile as shown in FIG. 5 with an asymmetric envelope curve is shaped in a region 56. The envelope curve of the relief profile in the region 55 is defined for example by the following geometrical parameters:

Two-dimensional optical-diffraction grating (symmetrical diffraction grating with a period of 4 µm (250 L/mm), for example a cross grating, a grating with circular or hexagonal grating lines.

The geometrical spacing of the element surfaces in the region 55 is 195 nm (optical spacing 290 nm), with a geometrical structure depth of 780 nm, that is to say 4 times the geometrical spacing.

The envelope curve of the relief profile in the region: 56 is a symmetrical diffraction grating with a period of 4 µm (250 L/mm). The geometrical spacing of the element surfaces in the region 56 is 81 nm (optical spacing 270 nm), with a geometrical structure depth of 720 nm, that is to say 4 times the geometrical spacing.

When viewing from a standard viewing position (FIG. 8a) the region 56 appears red and region 55 green. Upon rotation of the film element through 180° the region 56 appears blue and the region 55 still appears green.

Figure 9A:
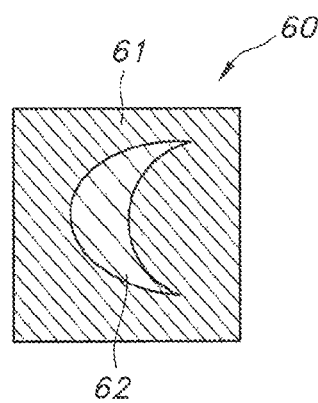
FIG. 9a shows a plan view onto a region of a film element according to the invention with a first light incidence direction.
Figure 9B:
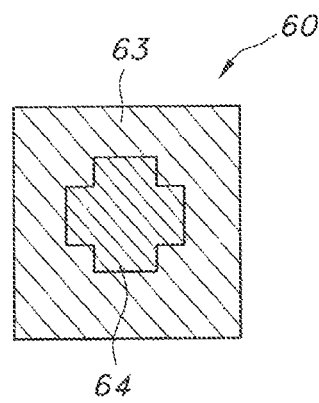
FIG. 9b shows a plan view onto the region of FIG. 9a with a second light incidence direction.

FIGS. 9*a* and 9*b* show a region 60 of a further film element according to the invention. With a standard viewing position (FIG. 9*a*) a region 62 appears red to the human viewer and a region 61 green. Upon rotation of the film element through 90° a region 64 appears in a red color and a region 63 green. As shown in FIGS. 9*a* and 9*b* in that case the configuration of the regions 61, 63 and 62, 64 respectively differs.

This is implemented by the region 60 being subdivided into a plurality of domains which each extend over the entire length of the region 60 and which are each of a width of 100 μm. In addition the domains are each subdivided into a first subregion and a second subregion which also each extend over the entire length of the region 60. In this case four different relief profiles are shaped into the replication layer of the film element in the region 60: on the one hand a first relief profile corresponding to the relief profile of FIG. 3 and having a symmetrical envelope curve. The envelope curve of the first relief profile is formed here by a linear grating having a spatial frequency of 200 L/mm (5 μm period) and of a (geometrical) profile depth of 733 nm (4 times the geometrical spacing). The optical spacing between the element surfaces is 275 nm (geometrical spacing 182 nm with a refractive index of 1.5). The second relief profile only differs in relation to the first relief profile in that the azimuth angle of the second relief profile is rotated through 90° relative to that of the first relief profile. The third relief profile only differs in relation to the first relief profile in that the geometrical spacing between the element surfaces is 220 nm. The fourth relief profile only differs in relation to the third relief profile in that the azimuth angle of the third relief profile is turned through 90° with respect to the azimuth angle of the fourth relief profile.

In the regions of the first subregions of the domains which overlap with the region 61 the first relief profile is shaped into the replication layer. The third relief profile is shaped into the replication layer in the regions of the first subregions of the domains which overlap with the region 62. The fourth relief profile is shaped into the replication layer in the regions of the second subregions of the domains which overlap with the region 63. The second relief profile is shaped into the replication layer in the regions of the second subregions of the domains which overlap with the region 64.

In addition it is also possible that the domains do not extend over the entire length but over the entire width of the region 60 and/or the width of the domains is selected to be different, in which case the width of the domains is to be selected at between 300 μm and 10 μm.

Figure 10A:
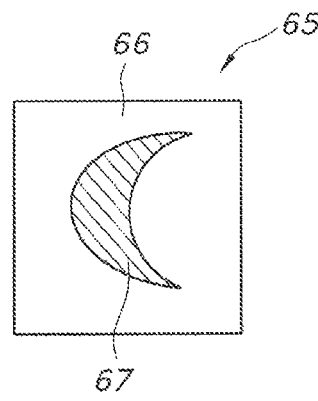
FIG. 10a shows a plan view onto a region of a film element according to the invention with a first light incidence direction.
Figure 10B:
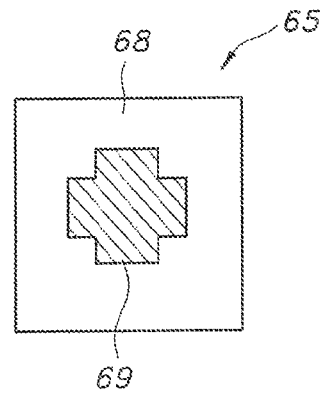
FIG. 10b shows a plan view onto the region of FIG. 10a with a second light incidence direction.

FIGS. 10*a* and 10*b* show a region 65 of a further film element according to the invention. The region 65 is like the region 60 of FIGS. 9*a* and 9*b*, with the difference that the first relief profile is shaped into the replication layer only in the regions of the first subregions of the domains which overlap with a region 67, and the fourth relief profile is shaped into the replication layer in the regions of the domains which overlap with a region 69. With a standard viewing situation (FIG. 10*a*) the region 67 appears green to the human viewer whereas the region 66 appears colorless. When the film element is rotated through 90° (FIG. 10*b*) the region 69 appears red to the human viewer and the region 68 appears colorless.

Figure 11:
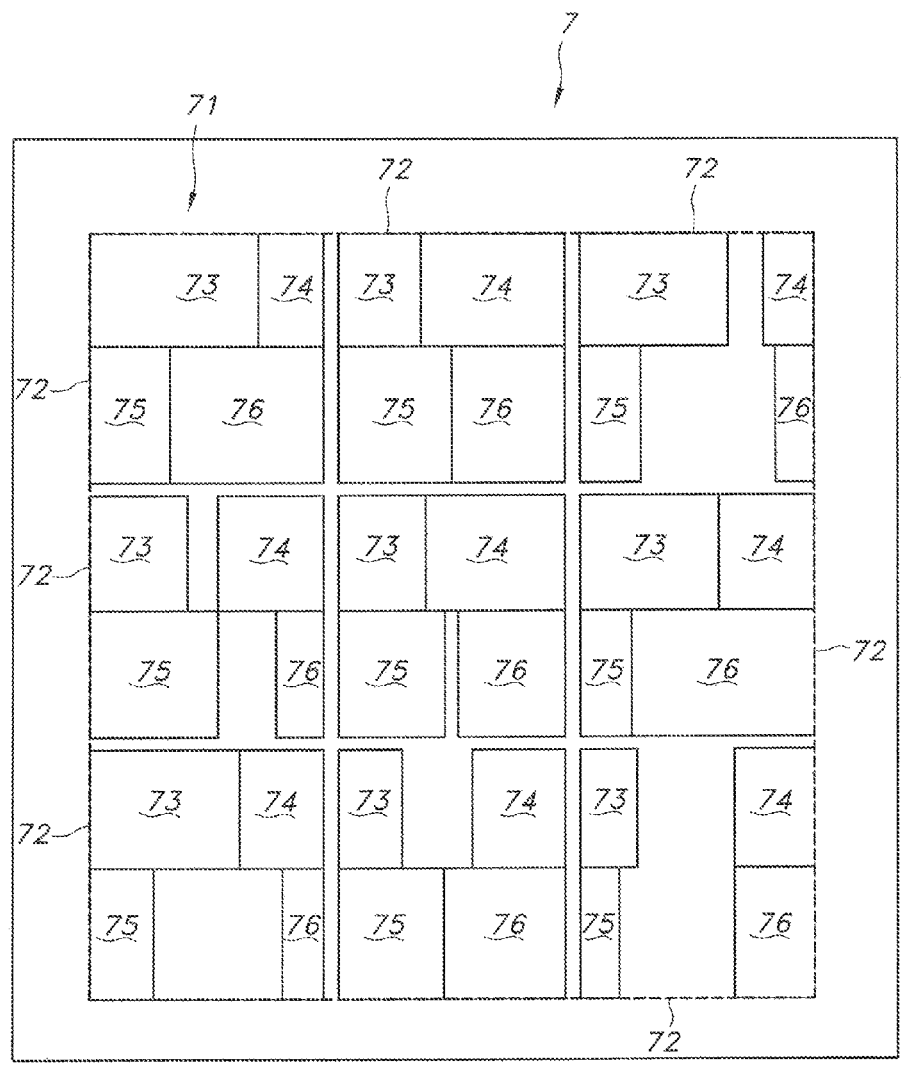
FIG. 11 shows a plan view onto a region of a film element according to the invention for a further embodiment of the invention.

FIG. 11 shows a further embodiment of the invention, by means of which it is possible to implement a multi-color hologram.

FIG. 11 shows a region 71 of a film element 7. The region 71 is subdivided into a plurality of domains 72. The domains 72 are each preferably of the same dimensions. At least in one direction the dimension of the domains 72 is less than 300 μm.

In the embodiment shown in FIG. 11 the domains 72 are of a dimension of less than 300 μm both in the longitudinal direction and also in the transverse direction, while in the FIG. 11 embodiment they are of a dimension of 100×100 μm.

The domains each have one or more of the regions 73, 74, 75 and 76, with a different surface profile being shaped in a replication layer of the film element 7 in each of the regions 73 through 76. In this case the relief profiles are of the configuration shown in FIG. 3, wherein the envelope curve of the relief profiles coincides in the regions 73 and 75 on the one hand and 74 and 76 on the other hand. In addition however the optical spacing of the element surfaces of the surface profiles differs in the regions 73 and 75 on the one hand and 74 and 76 on the other hand.

The spatial frequency and the azimuth angle of the envelope curves of the surface reliefs in the regions 73 and 75 on the one hand and 74 and 76 on the other hand are in this case so selected that the light incident in those regions is diffracted in different directions in the first (and minus-first) diffraction order so that the representation generated by the regions 73 and 75 is visible at a first spatial angle and the representation generated by the regions 74 and 76 is visible at a second spatial angle differing therefrom. In addition the color value and the brightness of the respective pixel in the representation visible at the first spatial angle is determined by the area component of the regions 73 and 75 in the respective domains. A corresponding point applies to the surface area component of the regions 74 and 76 for the representation which is visible at the second spatial angle.

In addition it is also possible that, besides the regions 73 through 76, there are still further regions in the domains 72, which are either associated with further spatial angles or which differ in terms of the spacing of the element surfaces.

A further preferred embodiment of the invention will now be described hereinafter with reference to FIGS. 12 and 13.

In these embodiments the first and/or second regions respectively comprise two or more subregions which are of a strip-shaped configuration. The centroid line of such a strip can in this case not only form a straight line, but it is also possible for the centroid line to be of some other configuration and for example to be of a configuration in the form of a wiggly line, the configuration of a zig zag line or the configuration of a circular ring. Preferably in this case the width of the strip-shaped subregion is less than 300 μm and the length of the strip-shaped subregion is longer than the width by at least the factor of 5. In addition the centroids of the strip-shaped subregions are preferably arranged substantially parallel to each other and spaced from each other in accordance with a periodic raster grid. The raster width of that raster is in this case preferably also below 300 μm.

Figure 12:
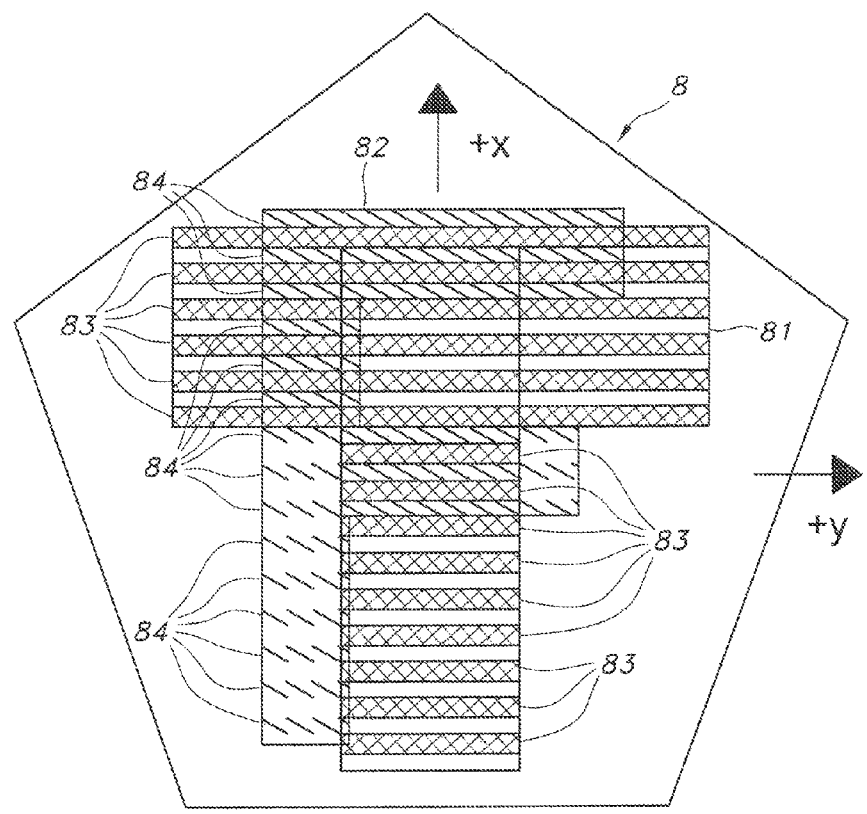
FIG. 12 shows a plan view onto a region of a film element according to the invention for a further embodiment of the invention.

FIG. 12 now shows a film element in the form of a security element 8. The security element 8 has a first region 81 and a second region 82. The first region 81 comprises a plurality of subregions 83 which are of a strip-shaped configuration, as shown in FIG. 12. In this case the strip-shaped subregions 83 are arranged in mutually parallel relationship and their centroid lines are spaced from each other in accordance with a periodic raster with a raster width of below 300 μm. The width of the subregions 83 is for example 100 μm and their length is in the region of 1 or more mm.

The second region 82 also comprises a plurality of strip-shaped subregions 84 which are also arranged in mutually parallel relationship in accordance with a periodic raster of a raster width in the region of below 300 μm. The width of the subregions 84 is for example also 100 μm and the length thereof is also in the region of 1 or more mm.

As shown in FIG. 12 the subregions 83 and 84 forming the regions 81 and 82 are each of such a length and are so arranged relative to each other that the outline of the regions 81 and 82 respectively codes an item of information, here for example the letter "T" or the letter "F". In addition the subregions 83 and 84 are at least region-wise rastered in each other so that region-wise (sub-)portions of the subregions 84 are arranged between (sub-)portions of the subregions 83 or vice-versa. In this case the letter "T" and "F" cover for example a region of about 10 mm*10 mm.

Shaped in the subregions 83 and 84 are different diffractive surface reliefs which differ for example in their envelope curve, the spacing of their element surfaces and/or in the angle of inclination of the base surfaces with respect to the underside of the replication layer, as already discussed hereinbefore. In relation to the configuration of the surface structures provided in the subregions 83 and 84 attention is directed to the configuration of the surface structures 27, 46 and 49 shown in FIGS. 3 and 5.

Many novel effects can be generated by the specific configuration of the regions 81 and 82 and the interrastering of the subregions 83 and 84: thus it is possible for example to use a surface relief with an asymmetric envelope curve in the region 81. In that case the envelope curve has for example a period of 4 μm and an azimuth angle of 0°, that is to say the inclined surface of the envelope curve is oriented along the −x-axis. The base surface, in relation to which the element surfaces are arranged substantially parallel, includes an angle of about 10° with the underside of the replication layer, that is to say the plane defined by the lower surface of the replication layer. The spacing between the element surfaces is between about 100 nm and 250 nm with a refractive index of about 1.5 so that the region 81 appears green. Shaped in the region 82 is a surface relief which has the same asymmetric envelope curve, in which case however the inclined flank of the asymmetric envelope curve is oriented along the +x-axis, that is to say it has an azimuth angle of 180°. The base surface in relation to which the element surfaces of the surface relief are oriented substantially parallel also includes a small angle, namely an angle of about 10°, with the underside of the replication layer. In this case the inclination of the base surface is directed in the direction of the +x-axis, which also applies to the relief structure shaped in the region 81. The spacing between the element surfaces is here so selected that the region 82 appears red when it is viewed along the 0° azimuth direction. When therefore the security element 8 is viewed from the 0° azimuth direction the human viewer sees a "T" which appears green. When the security element 8 is rotated through 180° the human viewer sees the letter "F" as red. A similar effect is presented when the security element 8 is inclined backwards and forwards. When the security element 8 is inclined towards the viewer a letter "T" which appears green is visible and when the security element 8 is inclined away from the viewer a red letter "F" becomes visible.

A further optical effect can be achieved by the envelope curve of the surface relief in the region 81, as described above, involving an azimuth angle of 0° whereas however the envelope curve of the surface relief in the region 82 has an azimuth angle of 90° (orientation along the +y-axis). When the security element 8 is viewed from the standard position (direction of viewing along the 0° azimuth direction) then a green "T" becomes visible, when the security element 8 is viewed from the side (90° azimuth direction) then a red "F" becomes visible.

Figure 13:
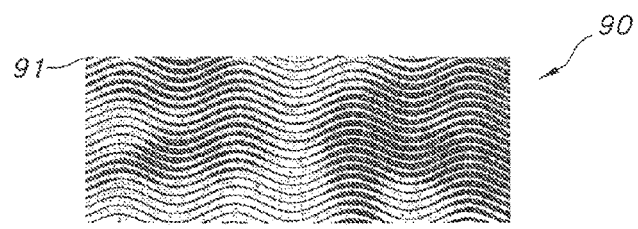
FIG. 13 shows a plan view onto a region of a film element according to the invention for a further embodiment of the invention.

In addition it is also possible, as shown in FIG. 13, for the strip-shaped subregions 83 and 84 not to be shaped in line form of constant width, but for the subregions to be modulated in respect of their width. Thus FIG. 13 shows a region 90 of a security element which has a plurality of subregions 91 which are modulated in their width. The centroid lines of the subregions 91 in this case are arranged parallel to each other and are of a configuration in the shape of a wiggly line. The width of the subregions 91 in this case is modulated to constitute a gray scale image. A surface relief is shaped in the replication layer of the security element in the subregions 91 and corresponds to the surface reliefs already described hereinbefore with reference to FIGS. 3, 5 and 12.

The invention claimed is:
1. A film element having a replication layer, wherein an optically active surface structure is shaped in a first surface of the replication layer, and
    wherein the surface structure is formed in at least a first region of the film element by a first diffractive surface relief comprising a plurality of successive reflection elements following a first envelope curve, wherein the reflection elements respectively comprise a reflective element surface arranged substantially parallel to a base plane and at least one flank adjoining the adjacent element surface or surfaces, the element surfaces of adjacent elements are spaced in a direction perpendicular to the base plane such that the element surfaces of at least three adjacent elements each have a different height with respect to each other and the base plane, with a first optical spacing or a plurality of the first optical spacing, wherein the first optical spacing is between 150 nm and 800 nm, the first envelope curve has a spatial frequency of between 100 L/mm and 2000 L/mm and an optical depth at at least one location of more than 450 nm and the relief shape and the spatial frequency of the envelope curve are so selected that the incident light is diffracted into one or more first directions to represent a first item of information, the color value of said diffracted light being further influenced by interference determined by the first optical spacing, wherein the optical depth is defined by the geometric difference between a minimum and a maximum perpendicular distance of the envelope curve with respect to the base plane, and
    wherein, in at least one second region, the surface structure is formed by a second surface relief which differs from the first surface relief and which represents a second item of information, and
    wherein the second surface relief also comprises a plurality of successive elements following a second envelope curve, wherein the elements respectively comprise an element surface arranged substantially parallel to the base plane and at least one flank adjoining the adjacent element surface or surfaces, the element surfaces of adjacent elements are spaced in a direction perpendicular to the base plane, with a second optical spacing or a plurality of the second optical spacing, wherein the second optical spacing is between 150 nm and 800 nm, the second envelope curve has a spatial frequency of between 100 L/mm and 2000 L/mm and an optical depth of more than 450 nm and the relief shape and spatial frequency of the second envelope curve are so selected that the incident light is diffracted in one or more second directions to represent the second item of information, the color value of which is further determined by the second spacing, wherein the optical depth is defined by the geometric difference between a minimum and a maximum perpendicular distance of the second envelope curve with respect to the base plane, and wherein an area of the surface structure is subdivided into a plurality of mutually adjoining domains which in at least one direction are of a dimension of less than 300 µm and provided in the domains of a first group of domains are respectively at least one of the first region and at least one the second region.

2. A film element as set forth in claim 1, wherein the first region has a smallest dimension of more than 50 µm.

3. A film element as set forth in claim 1, wherein the first region is shaped in the form of one or more symbols or a portrait.

4. A film element as set forth in claim 1, wherein the first envelope curve has an asymmetric relief profile.

5. A film element as set forth in claim 1, wherein the first envelope curve is a Kinegram®.

6. A film element as set forth in claim 1, wherein the first envelope curve has a first constant spatial frequency in a first spatial direction.

7. A film element as set forth in claim 6, wherein the first envelope curve has a second constant spatial frequency which differs from the first constant spatial frequency in a second spatial direction which differs from the first spatial direction.

8. A film element as set forth in claim 1, wherein the first envelope curve is a one-dimensional grating.

9. A film element as set forth in claim 8, wherein the centroids of the first subregions are spaced from each other in accordance with a periodic first raster with a raster width of less than 300 µm.

10. A film element as set forth in claim 8, wherein the width of the first subregions is varied to form a gray scale image.

11. A film element as set forth in claim 1, wherein the first region is formed by two or more first subregions which are of a strip-shaped configuration of a width of less than 300 µm.

12. A film element as set forth in claim 1, wherein the at least one second region adjoins the first region or regions.

13. A film element as set forth in claim 1, wherein the first region entirely encloses the second region or the second region entirely encloses the first region.

14. A film element as set forth in claim 1, wherein the first envelope curve is a one-dimensional grating and wherein the second region is formed by two or more second subregions which are of a strip-shaped configuration of a width of less than 300 µm, the second subregions are spaced from each other in accordance with a periodic second raster of a raster width of less than 300 µm and at least region-wise a second subregion is arranged between two first subregions.

15. A film element as set forth in claim 1, wherein the first and/or the second region is shaped in pattern form in the form of a third and fourth item of information respectively.

16. A film element as set forth in claim 1, wherein the first and the second item of information and/or the third and the fourth item of information represent mutually supplemental items of information.

17. A film element as set forth in claim 1, wherein the second surface relief is a diffraction grating, a Kinegram® or a hologram.

18. A film element as set forth in claim 1, wherein the second surface element is a matt structure, a macrostructure or a blaze grating.

19. A film element as set forth in claim 1, wherein the first envelope curve and the second envelope curve are different envelope curves and diffract the incident light in different directions.

20. A film element as set forth in claim 19, wherein the spatial frequency and/or the azimuth angle of the first and second envelope curves differ, wherein the azimuth angle is defined as the angle of the direction in which the structure elements of the envelope curve follow each other.

21. A film element as set forth in claim 20, wherein the azimuth angles of the first and second envelope curves are oriented at a right angle to each other.

22. A film element as set forth in claim 19, wherein the relief shape of the first envelope curve is symmetrical and the second envelope curve is asymmetric or vice-versa.

23. A film element as set forth in claim 19, wherein the first and second envelope curves have mutually mirror-inverted asymmetric profile shapes.

24. A film element as set forth in claim 1, wherein the first and the second envelope curves are the same.

25. A film element as set forth in claim 1, wherein the first optical spacing differs from the second optical spacing by more than 25 nm.

26. A film element as set forth in claim 1, wherein the base surface in relation to which the element surfaces are arranged parallel in the first region and the base surface in relation to which the element surfaces are arranged parallel in the second region include relative to each other an angle of inclination of more than 0°.

27. A film element as set forth in claim 1, wherein at least one of the first region but not one of the second region is respectively provided in the domains of a second group of domains and at least one of the second region but not one of the first region is respectively provided in the domains of a third group of domains.

28. A film element as set forth in claim 1, wherein each of the domains has at least one of the first region and at least one of the second region.

29. A film element as set forth in claim 1, wherein the area component of the first and/or the second regions in the domains is varied.

30. A film element as set forth in claim 1, wherein the first and second envelope curves are the same and the first and second optical spacings from each other differ so that a multi-colored optically variable representation is generated for the human viewer.

31. A film element as set forth in claim 1, wherein the first and second envelope curves differs from each other and diffract the incident light in mutually different first and second directions.

32. A film element as set forth in claim 31, wherein domains further have third and fourth regions in which a third and fourth envelope curve corresponding to the first envelope curve and the second envelope curve respectively forms the surface structure and the third and fourth envelope curves only differ from the first envelope curve and the second envelope curve respectively in that their optical spacing differs from the first optical spacing and the second optical spacing respectively.

33. A film element as set forth in claim 1, wherein the element surfaces are respectively larger than 100 nm.

34. A film element as set forth in claim 1, wherein the element surfaces occupy between 10% and 50% of the area of each element.

35. A film element as set forth in claim 1, wherein the base surface in relation to which the element surfaces are oriented substantially parallel is inclined with respect to the second surface of the replication layer, that is opposite to the first surface thereof.

36. A film element as set forth in claim 1, wherein a metallic reflection layer, is applied to the first surface of the replication layer.

37. A film element as set forth in claim 1, wherein a high refractive index (HRI) layer, is applied to the first surface of the replication layer.

38. A film element as set forth in claim 36, wherein the reflection layer or an optical separation layer is applied region-wise in pattern form to the first surface of the replication layer.

39. A film element as set forth in claim 1, wherein the film element is a lamination film or a transfer film and also has a carrier film arranged on the side of the second surface of the replication layer that is remote from the first surface.

40. A film element as set forth in claim 1, wherein the film element is arranged on a carrier substrate of a security document in such a way that it at least partially covers over a window-shaped opening in the carrier substrate.

* * * * *